(12) United States Patent
Cheetham

(10) Patent No.: US 8,781,741 B2
(45) Date of Patent: Jul. 15, 2014

(54) MULTI-BODY DYNAMICS METHOD OF GENERATING FUEL EFFICIENT TRANSFER ORBITS FOR SPACECRAFT

(75) Inventor: Bradley Cheetham, Boulder, CO (US)

(73) Assignee: Geryon Space Technologies, Boulder, CO (US)

( * ) Notice: Subject to any disclaimer, the term of this patent is extended or adjusted under 35 U.S.C. 154(b) by 40 days.

(21) Appl. No.: 13/426,746

(22) Filed: Mar. 22, 2012

(65) Prior Publication Data

US 2012/0248253 A1    Oct. 4, 2012

Related U.S. Application Data

(60) Provisional application No. 61/470,688, filed on Apr. 1, 2011.

(51) Int. Cl.
*G01C 21/24* (2006.01)
*B64G 1/10* (2006.01)
*G05D 1/00* (2006.01)

(52) U.S. Cl.
CPC ... *B64G 1/10* (2013.01); *G05D 1/00* (2013.01)
USPC ...................................... 701/531; 244/158.4

(58) Field of Classification Search
USPC ............ 244/158.6, 158.8, 158.4; 701/13, 531
See application file for complete search history.

(56) References Cited

U.S. PATENT DOCUMENTS

| | | | |
|---|---|---|---|
| 5,561,837 A | 10/1996 | Muller | |
| 6,708,116 B2 | 3/2004 | Wright | |
| 6,751,531 B2 | 6/2004 | Belbruno | |
| 7,197,381 B2 | 3/2007 | Sheikh | |
| 2001/0028020 A1 | 10/2001 | Fleeter | |
| 2002/0190160 A1 | 12/2002 | Fleeter et al. | |
| 2003/0010868 A1 | 1/2003 | McDermott et al. | |
| 2003/0042369 A1 | 3/2003 | Carpenter et al. | |

(Continued)

FOREIGN PATENT DOCUMENTS

WO       9847765 A1    10/1998

OTHER PUBLICATIONS

Sucarrat, Elisabet H. "Study of LEO to GEO transfers via the L1 Sun-Earth or Earth-Moon libration points." Universitat Politècnica de Catalunya. Published online Mar. 9, 2009. Retrieved from [http://hdl.handle.net/2099.1/6546].*
International Search Report from PCT/US2012/030056 Oct. 4, 2012.

(Continued)

*Primary Examiner* — Tien Dinh
*Assistant Examiner* — Michael Kreiner
(74) *Attorney, Agent, or Firm* — Marsh Fischmann & Breyfogle LLP; Kent A. Lembke

(57) ABSTRACT

A method of generating orbital transfers for spacecraft. The method provides an innovative technique for transferring spacecraft from one Earth orbit to another Earth orbit using significant solar gravitational influences. In one particular implementation, the multi-bodies in the transfer determination are the Earth (about which the spacecraft is to orbit) and the Sun (e.g., the Earth and the Sun are the first and second celestial bodies providing multi-body dynamics). The transfer orbit or trajectory is determined to make use of efficient tangential maneuvers by leveraging solar gravitational influences to improve transfer performance. Based on the generated transfer orbit, the spacecraft is controlled to perform one or more maneuvers to achieve a transfer orbit that traverses into a regime where the spacecraft's trajectory is significantly affected by gravity from both the Sun and the Earth. The spacecraft performs a near-tangential orbit insertion maneuver to enter the final orbit.

9 Claims, 7 Drawing Sheets

(56) References Cited

U.S. PATENT DOCUMENTS

| | | |
|---|---|---|
| 2003/0132350 A1 | 7/2003 | Goldstein et al. |
| 2005/0211828 A1 | 9/2005 | Gloyer et al. |
| 2006/0049315 A1 | 3/2006 | Patel et al. |
| 2010/0090065 A1 | 4/2010 | Patel et al. |

OTHER PUBLICATIONS

Szebehely, V., Theory of Orbits: The Restricted Problem of Three Bodies, Academic Press, New York, 1967.

Gomez, G., Koon, W.S., Marsden, J.E., Masdemont, J., and Ross, S.D., Connecting Orbits and Invariant Manifolds in the Spacial Restricted Three-Body Problem, Nonlinearity, vol. 17, pp. 1571-1606, 2004.

Ross, S.D., Cylindrical Manifolds and Tube Dynamics in the Restricted Three-Body Problem, Ph.D. thesis, California Institute of Technology, Apr. 2004.

Koon, W.S., Lo, M.W., Marsden, J.E., and Ross, S.D., Shoot the Moon, AAS/AIAA Spaceflight Mechanics 2000, vol. 105, part 2, pp. 1017-1030, AAS/AIAA, 2000.

Conley, C., Low Energy Transit Orbits in the Restricted Three Body Problem, SIAM Journal Appl. Math., vol. 16, No. 4, pp. 732-746, 1968.

\* cited by examiner

MULTI-BODY DYNAMICS METHOD OF GENERATING FUEL EFFICIENT TRANSFER ORBITS FOR SPACECRAFT

CROSS-REFERENCE TO RELATED APPLICATIONS

This application claims the benefit of U.S. Provisional Application No. 61/470,688, filed Apr. 1, 2011, which is incorporated herein by reference in its entirety.

BACKGROUND

1. Field of the Description

The present description relates, in general, to transferring a spacecraft such as a satellite from one orbit about a celestial body such as the Earth to a second orbit about the same celestial body, and, more particularly, to methods and systems for generating a fuel efficient transfer orbit or transfer trajectory by leveraging multi-body dynamics on the spacecraft during such an orbital transfer.

2. Relevant Background

There are numerous situations in which it is necessary to move or "transfer" a spacecraft from one orbit to another orbit. For example, many spacecraft are first launched into a low Earth orbit (LEO or initial orbit) and then are transferred to a second Earth orbit. In a particular practical application, commercial communication satellites, broadcast satellites, weather satellites, and many other spacecraft begin in LEO or other initial orbit and then are maneuvered through a transfer orbit or transfer trajectory (or geostationary transfer orbit) into a geostationary Earth orbit (GEO or second orbit).

A GEO is a circular orbit at a fixed radius that causes the spacecraft to orbit 35,786 kilometers above the Earth's equator. An object in such an orbit has an orbital period equal to the Earth's rotational period such that the object appears motionless at a fixed position in the sky to ground observers. This is desirable for many satellites so that satellite antennas on the Earth's surface can be pointed to one fixed position in the sky to communicate with the orbiting satellite. In practice, numerous satellites orbit (or "revolve about") the Earth in this ring above the Equator, with each satellite in a particular slot or position.

For the owners of such satellites and other spacecraft, it is desirable that the orbital transfer be efficient to limit the required energy to affect the move between orbits such as the move from LEO to GEO. If less fuel is required, it may be much less expensive to launch a satellite and place it in orbit about the Earth. Alternatively, a larger or heavier payload may be placed in a particular orbit using the same or a smaller amount of fuel or using a less powerful propulsion system if the transfer orbit is designed to be more efficient or effective in moving a spacecraft between two orbits.

A basic or fundamental orbital transfer, such as the one developed by Walter Hohmann, involves a tangential maneuver to depart an initial orbit and a second tangential maneuver to enter the final orbit. In this regard, a "maneuver" is a deliberate change in velocity of a spacecraft (e.g., by expending fuel to operate a propulsion system) that results in a change of orbit for the spacecraft. This basic transfer considers the gravitational perturbations of a single point-mass such as mass or body about which the spacecraft is orbiting (e.g., the Earth). A spacecraft transfer to or from elliptical orbits that are coplanar uses a very similar process.

Traditionally, orbit transfers do not require the spacecraft to venture beyond the final orbit (e.g., the GEO) during the transfer and, often, not relatively far beyond the initial orbit (e.g., the LEO). For example, the objective of a designer of a transfer orbit (or transfer trajectory) may be to deliver a satellite from the surface of the Earth to a geostationary orbit or GEO. In such cases, a launch vehicle may place the satellite on a transfer orbit or an initial LEO, and the satellite itself, with its propulsion system, will then maneuver to enter into its final orbit. Orbit transfers, of course, may be constructed between almost any two orbits about any celestial body not just between LEO and a GEO.

A Hohmann-type transfer is a useful and even optimal transfer between two orbits when considering only a single point mass such as the Earth (e.g., for co-planar transfers at the Earth with a final orbit to initial orbit ratio of less than 11.94, the Hohmann transfer is optimal). FIG. 1 illustrates a graphic depiction 100 of the Hohmann transfer 120 between two circular orbits about a celestial body 104, with a similar transfer orbit or trajectory being used to affect a spacecraft transfer between two elliptical orbits. A first maneuver at a point or location (labeled "a") in the initial orbit 110 that involves a change in velocity, $\Delta v_a$, is used to cause the spacecraft 108 to leave the first or initial orbit 110 and move into or along the Hohmann transfer orbit or transfer trajectory 120. A second maneuver at a point or location (labeled "b") in the transfer orbit 120 that involves another change in velocity, $\Delta v_b$, is used to place the spacecraft 108 into the second or final orbit 114 (e.g., a GEO or the like) about the celestial body 104. A relatively large amount of fuel has to be expended even in the optimal Hohmann transfer, but owners of satellites or operators of other spacecraft have typically considered this a necessary expense and an already optimized aspect of placing a spacecraft in orbits.

In practice, it is rare for a mission to be concerned only with co-planar transfers such as shown in FIG. 1. Thus, additional considerations are made, when designing an orbit transfer, for the change of other parameters to the orbit. There are many parameters that can be changed; however, orbit inclination is often of most concern with "inclination" referring to the angle between a plane containing an orbit and a reference plane (e.g., with regard to Earth orbits, the reference plane is generally a plane passing through and containing the Equator and as such inclination is an angle measured between an orbit plane and the Equatorial plane). To modify a spacecraft's orbital inclination, a traditional approach is defined with respect to the flight path angle, the initial velocity, and the inclination change desired. The equation to evaluate maneuver size for inclination change may be stated as:

$$\Delta v_{i,only} = 2v_{initial}\cos(\phi_{fpa})\sin\left(\frac{\Delta i}{2}\right),$$

where $\Delta v_{i,only}$ is the maneuver or change in velocity, $v_{initial}$ is the spacecraft's present orbiting velocity, and $\Delta i$ is the change in inclination. In the simple case of a circular orbit, the cosine of the flight path angle, $\phi_{fpa}$, is one and, thus, does not impact the calculation. Additionally this maneuver is traditionally designed to occur at the nodal crossing of the orbit.

SUMMARY

The inventor recognized that orbital transfers may be uniquely improved (e.g., use less fuel/energy) by leveraging multi-body dynamics (e.g., gravitational interactions between the Earth, the Sun, and a spacecraft rather than just the Earth, and a spacecraft). Further, the inventor also understood or recognized that the inclination change maneuver equation provided above shows that improvements to maneuver performance may be obtained by performing the maneuver to change/affect orbit inclination when the spacecraft has a smaller velocity (i.e., $v_{initial}$ is lower).

In the Background, the fundamental components of an orbital transfer were explained, and those skilled in the art will understand that additional techniques exist for orbital transfers that have individual advantages. For example, other improvements for orbital transfers have been studied and implemented. These additional techniques include using more than two maneuvers during the transfer, combining orbit raise and inclination change maneuvers, and super-synchronous transfers that travel two to three times further than the target orbit to change the inclination of the orbit at a reduced orbital velocity. While these all demonstrate individual improvements to the orbital transfer, none significantly and explicitly take advantage of the Sun's gravitational attraction as does the proposed orbital transfer techniques. The challenge of leveraging this gravitational influence is confounded by the complexity of transfer design within a system perturbed significantly by multiple bodies. This difference makes the method described herein truly innovative such that the taught method(s) provides unique operational and performance advantages as listed specifically herein and more that will be recognized by mission designers and others.

Briefly, the present description addresses the above-discussed problems by providing a method of generating orbital transfers. This method may be used in controlling operations of (maneuvers performed by) spacecraft such as communication satellites and other spacecraft that may orbit the Earth or other celestial bodies (with the Earth being used as a non-limiting example of one of the celestial or large bodies in many of the examples). The orbital transfer generation method provides an innovative technique(s) for transferring spacecraft from one Earth orbit to another Earth orbit using significant solar gravitational influences. For instance, a spacecraft may be transferred or moved from a low Earth parking orbit or LEO at an inclination of 28.5 degrees to any other Earth orbit, including equatorial geostationary orbits or GEOs. In one particular implementation, the multi-bodies in the transfer determination are the Earth (about which the spacecraft is to orbit) and the Sun (e.g., the Earth and the Sun are the first and second celestial bodies providing multi-body dynamics).

In practice, the transfer orbit or trajectory is determined, such as by a transfer orbit generator or similar computer-based tool, to make use of efficient tangential maneuvers by leveraging solar gravitational influences to improve transfer performance. Based on the generated transfer orbit, the spacecraft is controlled to perform one or more maneuvers to achieve a transfer orbit that traverses into a regime where the spacecraft's trajectory is significantly affected by gravity from both the Sun and the Earth. This transfer orbit is designed such that, as the spacecraft returns to the Earth, its orbital plane, perigee altitude, and/or other orbital parameters will have changed to new targeted values (e.g., to place the spacecraft in a second/final orbit after traveling along the orbit transfer-defined flight path). The spacecraft then performs one or more near-tangential orbit insertion maneuvers to enter the final orbit.

The method taught herein takes the approach that it is desirable to leverage a more massive body for this gravitational assist, such as the Sun, as this provides numerous benefits to transfer performance and transfer availability. With this in mind, the orbit transfer generator (and generation method) is taught by describing the concept, technique, and a procedure that can be used to take advantage of the natural interactions of the Sun and the Earth on a spacecraft to generate orbit transfers that differ significantly from prior orbit transfers such as conventional Hohmann transfers. For example, a Hohmann transfer may be substantially contained within the radius of the final orbit while multi-body dynamics-based orbit transfers generated as described herein may require a spacecraft to travel well beyond or outside the final or target orbit prior to returning to the final orbit and its radius (e.g., the radius of a GEO or the like). In some cases, the spacecraft will travel to a radius or radial distance relative to the first celestial body (about which it is orbiting) that is at least ten time times the final orbit prior to having the spacecraft return to the first celestial body and the final orbit, which may require the performance of a maneuver.

More particularly, a method is provided for generating efficient transfer orbits. The method includes, for a spacecraft, identifying an initial orbit about a first celestial body and also identifying a target orbit for the spacecraft about the first celestial body. The method then includes, with a processor running a transfer orbit generator (e.g., computer program/software), generating a transfer orbit for the spacecraft from the initial orbit to the target orbit using gravitational effects of a second celestial body. The second celestial body is larger in mass than the first celestial body. The generating step may include building a stable three-body manifold that intersects the initial orbit and also include building an unstable three-body manifold that intersects the target orbit.

In some embodiments, the transfer orbit generation further includes selecting a segment from the stable manifold of an intermediate three-body orbit, selecting a segment from the unstable manifold of the same or different three-body orbit, and then discretizing both segments into a plurality of smaller segments. In such cases, the stable segment may have a first end intersecting the initial orbit corresponding to a location of a first maneuver for the spacecraft to move it into the transfer orbit. The stable segment may also have a second end, corresponding to a second maneuver for the spacecraft, interposed between the first and second celestial bodies (e.g., spaced apart from the first celestial body along a path defined by the stable segment toward the second celestial body). Similarly, the unstable segment may have a first end intersecting the target orbit corresponding to a third maneuver for the spacecraft and a second end, corresponding to the second maneuver, interposed between the first and second celestial bodies.

In the method, the transfer orbit generating process may further involve performing at least one of smoothing and optimizing on the discretized segments to form a continuous trajectory for the spacecraft, whereby the transfer orbit is defined by the continuous trajectory including locations of the first, last, and intermediate maneuvers. Additionally, the transfer orbit may define directions and magnitudes of the first, last, and intermediate maneuvers to transfer the spacecraft from the initial orbit to the target orbit.

In the method, the ends of the stable and unstable manifolds that are distal to the first celestial body may be at a radial distance that is at least ten times the radius of the target orbit. Further, the method may include controlling operations of a spacecraft based on the transfer orbit to transfer the spacecraft from the initial orbit to the target orbit about the first celestial body (e.g., to perform defined maneuvers to follow the transfer orbit). In one practical implementation of the method, the first celestial body is the Earth, the second celestial body is the Sun, the target orbit is a GEO, and the third body in the three-body model is the spacecraft (e.g., a communications satellite or the like). In some cases, the stable and unstable manifolds are built based on the Circular Restricted Three-Body Model (CRTBM).

According to another aspect of the invention, an apparatus is provided for generating transfer orbits for spacecraft that includes a processor (e.g., a CPU of a computer, a server, or the like) and memory/data storage. The memory is accessible by the processor and is used to store data defining an initial orbit for a spacecraft about a first body, data defining a target orbit for the spacecraft about the first body, and operational parameters for a spacecraft. The apparatus further includes computer readable code (e.g., software/programming) causing the processor to generate a transfer orbit using a model based on gravitational effects of a second body, about which the first body orbits, on the spacecraft. The transfer orbit generated is configured to define a continuous trajectory from the initial orbit to the target orbit.

The apparatus may be adapted such that the transfer orbit defines at least the following three maneuvers: a first maneuver to exit the initial orbit and enter a first portion of the continuous trajectory moving toward the second body, a intermediate maneuver to move toward the first body along a second portion of the continuous trajectory, and a last maneuver to insert the spacecraft into the target orbit about the first body. In some embodiments, the second maneuver is smaller in magnitude than the first maneuver. Further, the third maneuver may be substantially tangential in direction (e.g., to provide near-tangential orbit insertion into the target orbit from the transfer orbit). It may be the case that to improve efficiency, or based on other performance criteria, it may be useful to perform several intermediary maneuvers between the first and last maneuvers as outlined above (likely small maneuvers compared to the first and last maneuvers). To implement the apparatus, the model may be a three-body model, such as one in which the first body is the Earth and the second body is the Sun (and the third body is the spacecraft). The model may also include any number of other forces (e.g., solar radiation pressure and/or the gravitational attraction of other bodies).

DETAILED DESCRIPTION

Figure 1:
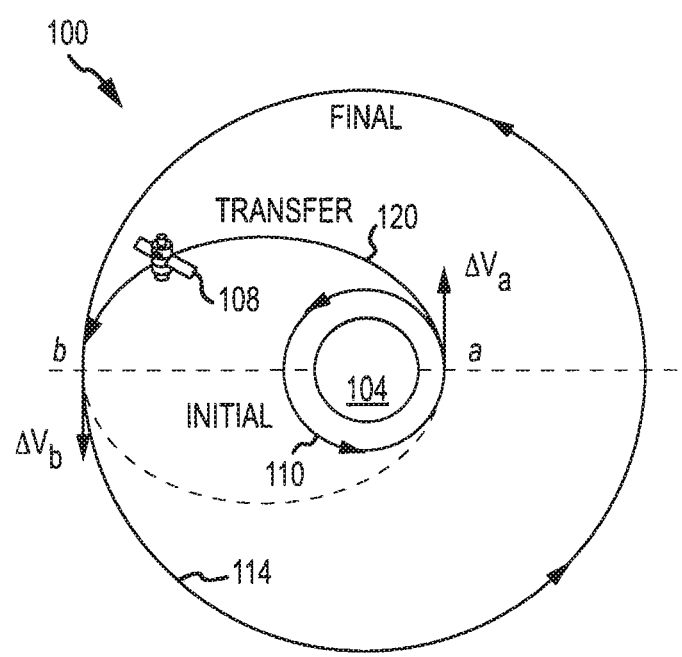
FIG. 1 illustrates a conventional Hohmann transfer used to move a spacecraft from an initial orbit to a final orbit about a celestial body such as the Earth.

Briefly, a method (and computer systems and software for implementing such a method) is described that generates orbital transfers or trajectories for use in controlling a spacecraft (or its propulsion systems) to move from a first orbit (initial orbit) about a first celestial body to a second orbit (final orbit) about the same celestial body by leveraging dynamics such as gravitation interaction among the spacecraft (a first small body), the first celestial body, and a second celestial body or mass (e.g., the Sun, another planet, or the like).

As will become clear, a concept and associated technique is described that may be used to transport a spacecraft from one orbit about a celestial body to another orbit about the same celestial body (e.g., the Earth or another planet) leveraging the gravitational attraction of a second, more massive, celestial body (e.g., the Sun, another star, a planet, or the like). The technique combines dynamical systems theory and numerical optimization to generate the spacecraft transfers (also called transfer orbits or transfer trajectories), which define how a controller (e.g., a remote or onboard spacecraft control system) operates a propulsion system to perform two, three, or more maneuvers.

More specifically, a systematic approach can be provided with the software tools of a transfer generation system to leverage advanced tools of dynamical systems theory to understand and design (or generate) three-dimensional transfers between orbits. The inventor recognized that a specific transfer technique, described below, could be utilized to increase the efficiency of transfers, and the transfer technique was created based in part on a recognition of the possibility for improvement of transfers (e.g., do not have to rely on two body dynamics) and identifying a useful approach to realize beneficial changes to how transfers are designed/generated for orbiting spacecraft. No previous work had identified this opportunity for change and improvement or applied the techniques described herein to trajectories which would return a spacecraft to an Earth orbit.

For example, a transfer or transfer trajectory may be constructed to transport a spacecraft from a low Earth 28.5-degree inclined parking orbit (similar to those used when spacecraft are launched from the United States) to an equatorial geostationary orbit or GEO. The transfer is configured specifically to use the gravitational attraction of the Sun (or another large celestial mass or body) to reduce the total velocity change required by the spacecraft, as compared to conventional transfer techniques, and, thereby, reduce the fuel or energy required to place the spacecraft in the second/final orbit.

Some of the steps in the outlined process for an orbit transfer and the process used to generate the transfer can be completed using different approaches readily understood by spacecraft mission designers and others skilled in the art. Hence, the described method teaches exemplary, but not limiting, tools and techniques that may be used, with a focus being placed on the combination of such tools to produce an enhanced transfer orbit or transfer trajectory.

Prior to describing the transfer orbit generation method (and corresponding system) it may be useful to provide definitions for a number of terms. A "maneuver" is a deliberate change in velocity resulting in a change of orbit for a spacecraft as may be achieved by selectively operating a propulsion system of a spacecraft based on a transfer orbit or trajectory (e.g., such a transfer defines locations for maneuvers and definitions of the maneuvers such as change in spacecraft velocity). A "two-body orbit" is an orbit defined by the gravitational interaction between two bodies, specifically a more massive body (often a planet) and a much smaller body with negligible relative mass (a spacecraft). In contrast, a "three-body orbit" is an orbit defined by the gravitational interaction between three bodies, specifically two large bodies (often planets or a planet and a star such as the Earth and the Sun) and a much smaller third body with negligible relative mass (a spacecraft).

Further, the term "apoapsis" refers to the point in an orbit of a satellite when it is at its furthest distance from the Earth (or other body about which it is orbiting sometimes labeled the first celestial body in the following description). The term "periapsis" refers to the point in an orbit of a satellite when it is at its closest distance to the Earth or other celestial body. A "GEO" (Geostationary Earth Orbit), as discussed above, is a circular orbit with an orbital period equal to the Earth's rotational period, an altitude of 35,786 km, and an inclination of 0 degrees. A "LEO" (Low Earth Orbit), also as discussed above, is commonly defined as an orbit about the Earth with an altitude of less than 2,000 km (and is sometimes the initial or first orbit from which a transfer is desired to a final or second orbit (e.g., a GEO or other orbit)). A "barycenter" is the center of mass between multiple celestial bodies and nominally the center of a rotating reference frame.

With regard to orbital elements, "eccentricity" is a metric defining the shape of an orbital ellipse relative to a perfect circle where 0 is a perfect circle and 1.0 is a parabola and, thus, no longer a closed orbit. An "orbital altitude" is the distance from the Earth's mean sea surface to the spacecraft. For a circular orbit, the orbital altitude is considered a near-constant value. The term "inclination" refers to the angle between the plane of an orbit and a reference frame. For Earth orbits, the reference plane is generally through the Equator, and, thus, inclination is the angle between the orbital plane and the equatorial plane (with a 0 degree inclination being associated with a GEO).

With these definitions in mind, a description of features and aspects of method of generating transfer orbits or trajectories is provided, with emphasis on the method's use of a three-body system or model for designing or generating controlling definitions for a spacecraft transfer between orbits. The innovative orbit transfers described herein primarily utilize the gravitational attraction of two celestial bodies (such as, but not limited to, the Earth and the Sun), whereas traditional orbit transfers involve or consider only one (such as the Earth).

The three-body system is a model that may be used to describe the motion of a spacecraft in the presence of two relatively massive bodies. Additionally, if the two massive bodies are assumed to orbit their combined barycenter in circular orbits, the motion of the spacecraft may be modeled by the Circular Restricted Three-Body Model (CRTBM)) as outlined by Szebehely, V. *Theory of Orbits: The Restricted Problem of Three Bodies*, Academic Press, New York, 1967, incorporated herein by reference. This model is often used in systems that include the Sun and the Earth (but, of course, in systems that were previously unrelated to or applied to transfer orbits or transfer trajectory design between orbits about the same body) as the two celestial bodies. The CRTBM has been shown by others and recognized by the inventor to approximate trajectories sufficiently for initial design, and the CRTBM is useful for the additional reason that the Earth orbits the Sun in a near-circular orbit.

Five equilibrium locations exist in the CRTBM, namely, the five Lagrange points $L_1$-$L_5$s. These are the locations where the gravitational attraction of both bodies balances with their motion about the barycenter. In an idealized case without any additional perturbations, a spacecraft placed in any of these five locations would remain at those locations indefinitely. In reality, however, these locations drift as a result of the real dynamics of the solar system and perturbations on the spacecraft that contribute additional deviations, which keep the spacecraft from remaining at the locations indefinitely.

Invariant manifolds are trajectories which exponentially depart (unstable) or approach (stable) the orbit in question as time moves forward due to the effects of the dynamical environment within which the equilibrium locations exist. A spacecraft leaving Lagrange points $L_1$, $L_2$, or $L_3$ departs along its unstable manifold in either of two directions, depending on the direction of the perturbation. A spacecraft leaving Lagrange points $L_4$ or $L_5$ remains within the region of each point due to the stability of those locations. Similarly, trajectories may be constructed that a spacecraft can follow to asymptotically approach Lagrange points $L_1$, $L_2$, or $L_3$ along the point's stable manifold.

Periodic and quasi-periodic orbits have been constructed in the CRTBM. Two classes of three-body orbits are particularly relevant to generating orbit transfers as described herein, namely, halo and Lissajous orbits about Lagrange points $L_1$ and $L_2$. Halo orbits are periodic orbits in the three-body model. That is, a spacecraft following a halo orbit traverses the same path in the three-body rotating coordinate frame every time it revolves about the Lagrange point. Lissajous orbits are quasi-periodic solutions where a spacecraft revolves about the Lagrange point and its out-of-plane motion has a different frequency than its in-plane motion.

At this point, it may be useful to discuss use of "manifolds" to design orbit transfers or trajectories, with the term manifold referring to the tube or other shape that encapsulates or within which a set of possible transfer orbits/trajectories fall. A spacecraft following an unstable three-body orbit, such as a halo or Lissajous orbit, may continue to follow that orbit indefinitely given a perfect initial state. However, much like the motion of a spacecraft at Lagrange points $L_1$ or $L_2$, a spacecraft following an unstable three-body orbit with additional perturbations will exponentially deviate from that orbit. As the spacecraft departs the orbit, it traces out one trajectory in the orbit's unstable manifold. The orbit's entire unstable manifold contains the collection of all trajectories that a spacecraft may take if it departs the orbit at any location along the orbit given a small perturbation in its state.

Similarly, trajectories may be constructed that are designed to asymptotically approach an unstable three-body orbit. Using numerical propagation schemes (e.g., those outlined in Gómez, G., Koon, W. S., Marsden, J. E., Masdemont, J., and Ross, S. D., "Connecting Orbits and Invariant Manifolds in the Spatial Restricted Three-Body Problem," *Nonlinearity*, Vol. 17, pp. 1571-1606, 2004; Ross, S. D., *Cylindrical Manifolds and Tube Dynamics in the Restricted Three-Body Problem*, Ph.D. thesis, California Institute of Technology, April 2004; and/or Koon, W. S., Lo, M. W., Marsden, J. E., and Ross, S. D., "Shoot the Moon," in *AAS/AIAA Spaceflight Mechanics* 2000, Vol. 105, part 2, pp. 1017-1030, AAS/AIAA, 2000, each of which is incorporated herein by reference) known or accessible to a person skilled in the art of mission design (at the time of this filing or later developed), it is possible to identify manifolds with specific characteristics.

Relevant to the work outlined in this discussion are manifolds that can be identified to meet specific orbits in position.

Such manifolds then serve as the baseline for creating spacecraft transfers (e.g., by the software modules/tools and/or computer systems/devices described herein). Often, these manifolds are found consistent in position-space with a desired initial or final orbit, but with a different velocity. This velocity difference is the origin on maneuver requirements for a spacecraft. After performing a specifically timed maneuver, a spacecraft is able to traverse the manifold trajectory in the desired direction.

Using manifolds as a baseline for trajectory design provides the mission designer with insight into the complicated dynamics affecting the spacecraft. This information is built upon by altering spacecraft maneuvers or modeling parameters to create a full fidelity trajectory, which incorporates all relevant perturbations that often extend beyond the gravitational influences of the primary and secondary bodies in the three-body system (e.g., the Earth and the Sun with the spacecraft being the third body of the three-body system).

As one example of the potential utility of the technology for generating transfer orbits or trajectories, the transfer efficiency, from an inclined launch site on the Earth, required to deliver a spacecraft to GEO is increased in terms of total fuel required (i.e., the total fuel is reduced) and in terms of maneuver requirements for the spacecraft (i.e., the spacecraft fuel requirement is significantly reduced). As the demand for bandwidth increases through this limited orbit (i.e., only so many slots for communications and other satellites), satellites are getting increasingly more powerful and often more massive. The increase in efficiency delivered by the technology disclosed here provides added payload capacity or extended spacecraft on-orbit fuel lifetime (i.e., place a larger satellite or payload in a particular GEO with fuel previously used for much smaller satellite or payload).

The method of generating transfer orbits may be thought of as a technique that uniquely generates trajectories from one Earth orbit to another Earth orbit using dynamical systems theory and optimization. These systems are modified and generalized to transfers from one orbit to another about any celestial body, where that celestial body is in orbit about another, more massive, celestial body. The orbital transfer produced by the described method(s)/system(s) reduces the total velocity change required by a satellite injected from an inclined orbit and also reduces the maneuver requirements on the spacecraft as compared to traditional transfers. Instead, this change of velocity requirement can be placed on the upper-stage of the launch vehicle or in some cases reduced overall.

More specifically, an innovative application of dynamical systems theory has been identified by the inventor (and is described herein) in which a transfer is designed such that a spacecraft may transfer from one orbit about the Earth to another orbit about the Earth more efficiently. The increased efficiency is realized, in part, by systematically using dynamical systems theory in conjunction with numerical optimization and by taking advantage of the gravity of the Sun to reduce the maneuver requirements for the transfer of a spacecraft. This is generalized to encompass any transfer from one orbit about the smaller body to another orbit about the smaller celestial body with an intermediate interaction with a more massive celestial body in a three-body system (with the smaller body being the Earth and the more massive body being the Sun in many present day or practical implementations).

The transfer produced by the taught method/system takes advantage of the gravitational attraction of the more massive body in the three-body system to reduce the ΔV of the transfer. Furthermore, the transfer described herein does not require the satellite to enter or maintain an orbit about any of the three-body stationary points, which is often impractical due to the excessive transfer time required for completion. Similarly, this transfer design relies only on the influence of a single more massive body, in the example mentioned the Sun, and does not require any other interactions with additional bodies.

The orbit transfers or trajectories are typically produced using computer code and/or programs provided in computer-readable medium (such as in memory of a typical computer system or server) that cause a computer to perform a number of steps or functions (e.g., to behave like a special purpose computer). However, before describing such a computer system and software along with stored/used data, it may be more useful to describe an exemplary implementation of an orbit transfer (or trajectory) generation method with reference to FIGS. 2-5.

Figure 2:
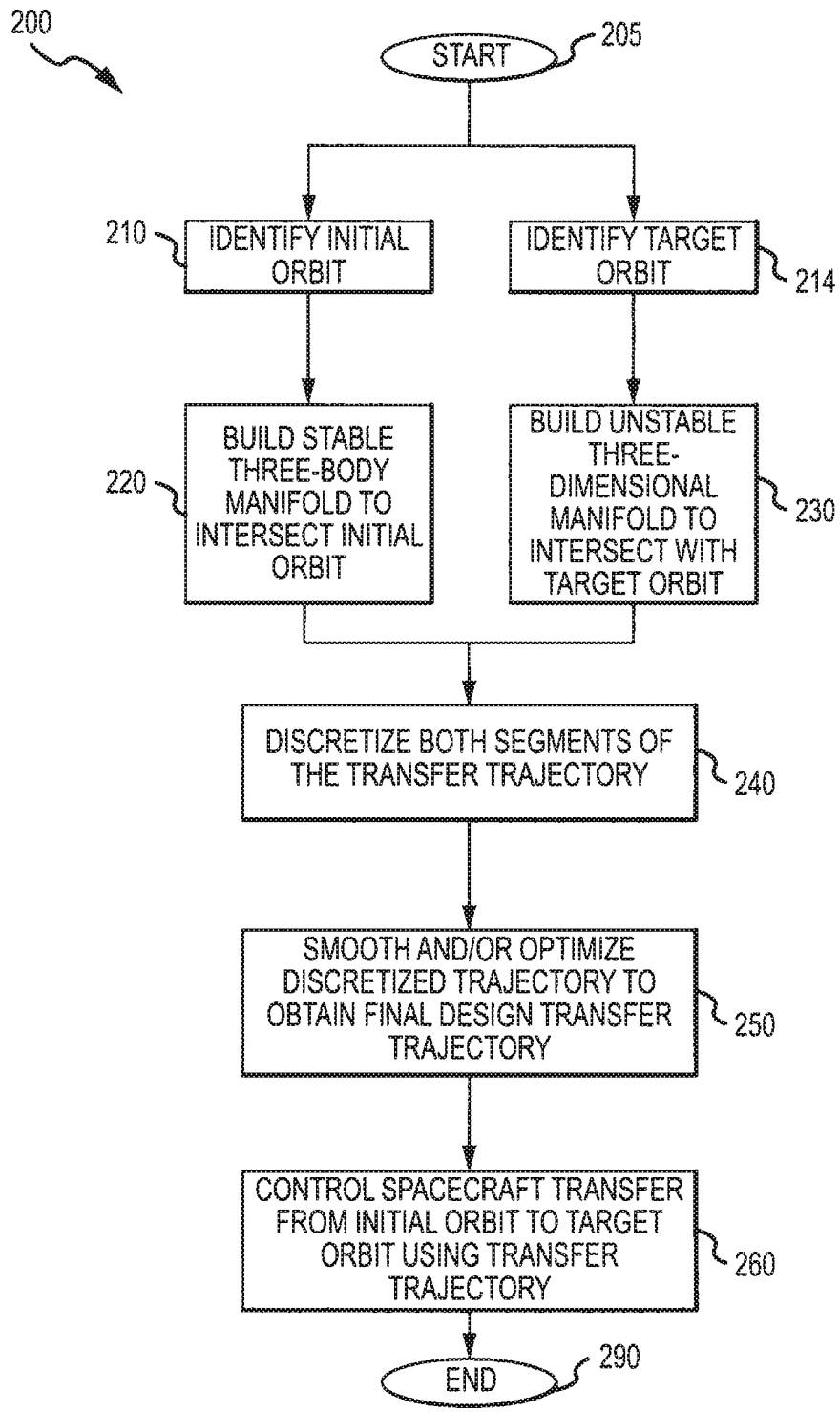
FIG. 2 illustrates a flow chart of one method for generating transfer orbits by leveraging multi-body dynamics (e.g., gravitational affects of Sun or other large celestial body on a spacecraft)

The trajectories described in this patent application can be generated using the method 200 shown in FIG. 2. The method 200 starts at 205 such as with loading the orbit transfer generation software suite or product onto a computer, which may be operated directly by a mission designer or be communicatively linked to a mission designer's system to receive input for generating the orbit trajectory (e.g., information about the spacecraft, the first celestial body or smaller mass body (e.g., the Earth), a launch location, and the like).

The method 200 continues at 210 with identifying an initial orbit for the spacecraft, and this may involve receiving input from a mission designer that includes their intended initial/first orbit or a first orbit (e.g., an LEO) may be calculated by the orbit transfer generation system. At 214, a target orbit is identified for the spacecraft, and, again, this may be provided as input by the requestor/mission designer or be calculated by the orbit transfer generation system.

Figure 3:
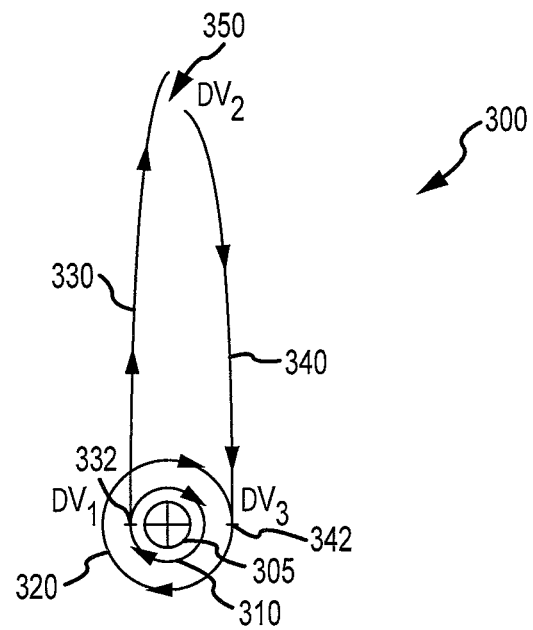
FIG. 3 provides a simplistic diagram of an initial transfer orbit produced by steps of the method of FIG. 2 in which an exit and a return segment or trajectory has been built using a three-body model.

FIG. 3 illustrates, with graph/schematic 300, initial identified data and initial outputs/products of the method 200. As shown, a first celestial (smaller mass) body 305 (e.g., the Earth, other planet, or the like) is chosen for the method 200, and a spacecraft (not shown) can be placed in an initial or first orbit 310 about the first celestial body 305. Further, a target or second orbit 320 is identified for the spacecraft to orbit about the first (same) celestial body 305. For example, the spacecraft may be a communications satellite and the target orbit 320 may be a slot within the GEO assigned to the satellite.

The method 200 continues with systematically building an unstable three-dimensional three-body orbit, the transfer orbit, in the three-body system (initial body-larger body-spacecraft such as the Earth-Sun-spacecraft (e.g., satellite)), with the larger body or greater mass celestial body not shown in FIG. 3. The unstable transfer orbit (initial model of the transfer orbit or trajectory) includes a stable manifold (with one segment in this manifold shown at 330 in FIG. 3) and an unstable manifold (with one segment in this manifold shown at 340 in FIG. 3).

The unstable transfer orbit (provided by segments 330 and 340) is generated at steps 220 and 230 of method 200. Step 220 includes building a stable three-body manifold to intersect the initial orbit, and this is shown with the segment 330 intersecting the initial orbit 310 at location or 3D coordinates 332. Step 230 includes building an unstable three-dimensional manifold to intersect the target orbit, and this is shown with the segment 340 intersecting the target orbit 320 at location or 3D coordinates 342.

The segments 330, 340 are selected from sets of segments in the generated manifolds and are shown to nearly intersect at a location or at 3D coordinates 350. At location 350, a second maneuver would be performed by the spacecraft (via operation of its propulsion system) as shown with $\Delta V_2$ to end travel on first segment 330 and begin travel along second segment 340. The location 350 for the second (or "intermediate") maneuver is distal to the first celestial body 305, e.g., at a radial distance relative to the body 305 that is at least ten times the radius of target orbit 320 and sometimes 10 to 20 times or more in radial distance or orbit size. With regard to the resulting (but initial or not final) transfer orbit, its stable manifold intersects the position space of the initial orbit at the departure time (e.g., when a first maneuver is performed to leave the initial orbit 310 as shown at location 332 with $\Delta V_1$). Further, its unstable manifold intersects the position space of the target orbit at the arrival time (e.g., when a third/last maneuver is performed to enter the target orbit 320 as shown at location 342 with $\Delta V_3$).

Figure 4:
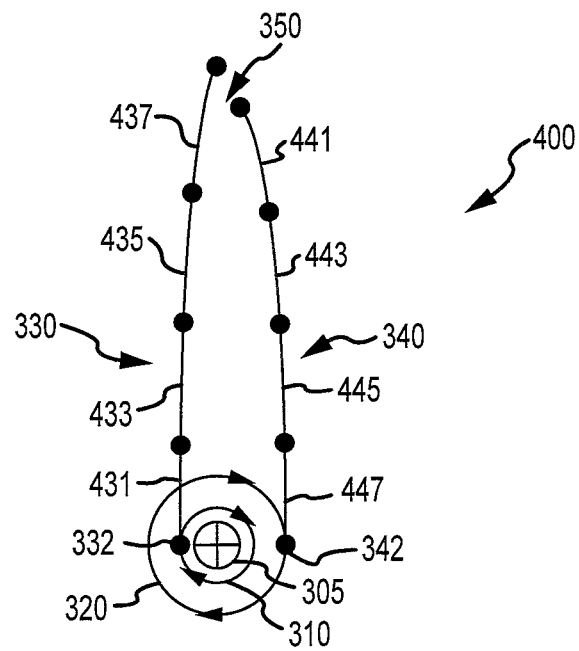
FIG. 4 shows an intermediate version or state of the transfer orbit showing that the segments or trajectories are further processed to discretize the transfer orbit.

The method 200 continues at 240 with discretizing both segments 330, 340 of the initially-produced transfer orbit or trajectory. FIG. 4 illustrates with graph/schematic 400 such discretization with segment 330 being broken into four segments 431, 433, 435, and 437 and segment 340 being broken into four segments 441, 443, 445, and 447. The number of segments may be nearly any number to practice the method 200 (e.g., 2 to 50 or more). In this manner in step 240, the particular trajectory 330 in the stable manifold of the transfer orbit that intersects the initial orbit 310 is discretized as is the particular trajectory 340 in the unstable manifold of the transfer orbit that intersects the target orbit 320. Step 240 typically includes constructing a list of patch-points, corresponding to states along the stable manifold and states along the unstable manifold until their first close approach near the transfer orbit.

Method 200 continues at 250 with the resulting discretized trajectory (e.g., the segments 330 and 340 shown in FIG. 4) being smoothed and/or optimized to obtain a final design transfer trajectory or orbit (i.e., the transfer orbit generated by method 200). The step/function of smoothing and/or optimizing is configured such that the trajectory is continuous at all places except where maneuvers are permitted. The addition of mid-course maneuvers to obtain this continuity is often possible and as a whole the transfer can be optimized for the characteristic of interest (i.e. total maneuver required, time of flight, and so on).

Figure 5:
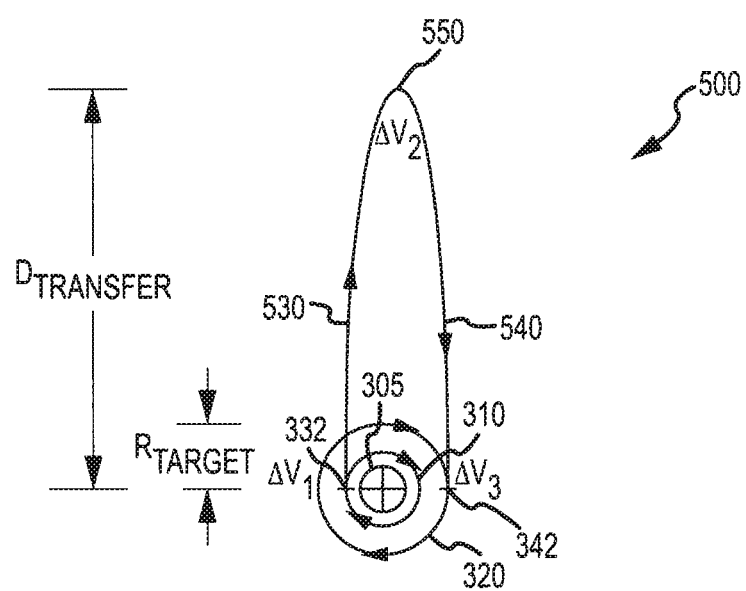
FIG. 5 illustrating a diagram of the final output of the transfer orbit method of FIG. 2 after smoothing and/or optimizing has been performed on the transfer orbit shown in FIG. 4.

FIG. 5 illustrates with graph/schematic 500 the final design or generated transfer trajectory made up of segment 530 (smoothed/optimized version of segment 330 from FIGS. 3 and 4) and segment 540 (smoothed/optimized version of segment 340 from FIGS. 3 and 4). As shown, the radial distance, $D_{Transfer}$, of the transfer orbit as measured from the center of the first celestial body 305 to the second maneuver location 550 (adjusted from location 350 to join the segments 530, 540) is significantly larger than the radius, $R_{Target}$, of the target orbit 320 (such as ten times or more greater in size). The transfer trajectory defines at least the three maneuvers ($\Delta V_1$, $\Delta V_2$, and $\Delta V_3$) performed at locations 332, 550, 342 that move the spacecraft from the initial orbit 310 to the transfer trajectory 530 and 540 and then into the target orbit 320 about the first/same celestial body 305.

Method 200 continues at 260 with the designed or output transfer trajectory being used by a mission designer (or a spacecraft control system) to control operations of a propulsion system of a spacecraft to move the spacecraft from the initial orbit into the transfer orbit/trajectory and then into the target orbit. To this end, the transfer trajectory includes all data needed to perform the maneuvers at 332, 550, 342 as shown with $\Delta V_1$, $\Delta V_2$, and $\Delta V_3$ (e.g., the timing of the maneuver is provided as is the direction of the maneuver and magnitude in change of velocity required to achieve the desired result for a particular maneuver). The method 200 then ends at 290 or may be repeated by starting over at steps 210, 214 with a new or the same spacecraft and a new or the same initial and target orbits.

As outlined above, it is important to note that the initial and final orbits may themselves be selected during the design of a transfer based on specific mission objectives. As an example, the performance of launch vehicles is highly variable and proprietary in nature, thus, for generality the above procedure begins at an initial orbit. In practice, though, the starting point may be directly from a launch or the initial orbit may be a design parameter which is selected based on unique launch vehicle performance capabilities. Additionally, an almost infinite number of manifolds and/or segments within such manifolds may be identified to serve as the basis for creating the transfer trajectory, and the selection of the manifolds and segments (such as segments 330, 340) dictates many performance parameters of the overall transfer. This is highlighted to demonstrate the variability of potential transfer appearance and performance. Furthermore, the number of points used in discretizing the trajectory and the specific smoothing and/or optimization scheme(s) used may be dependent on the preferences of the mission designer and are generally not limiting of the invention and method 200.

Figure 6:
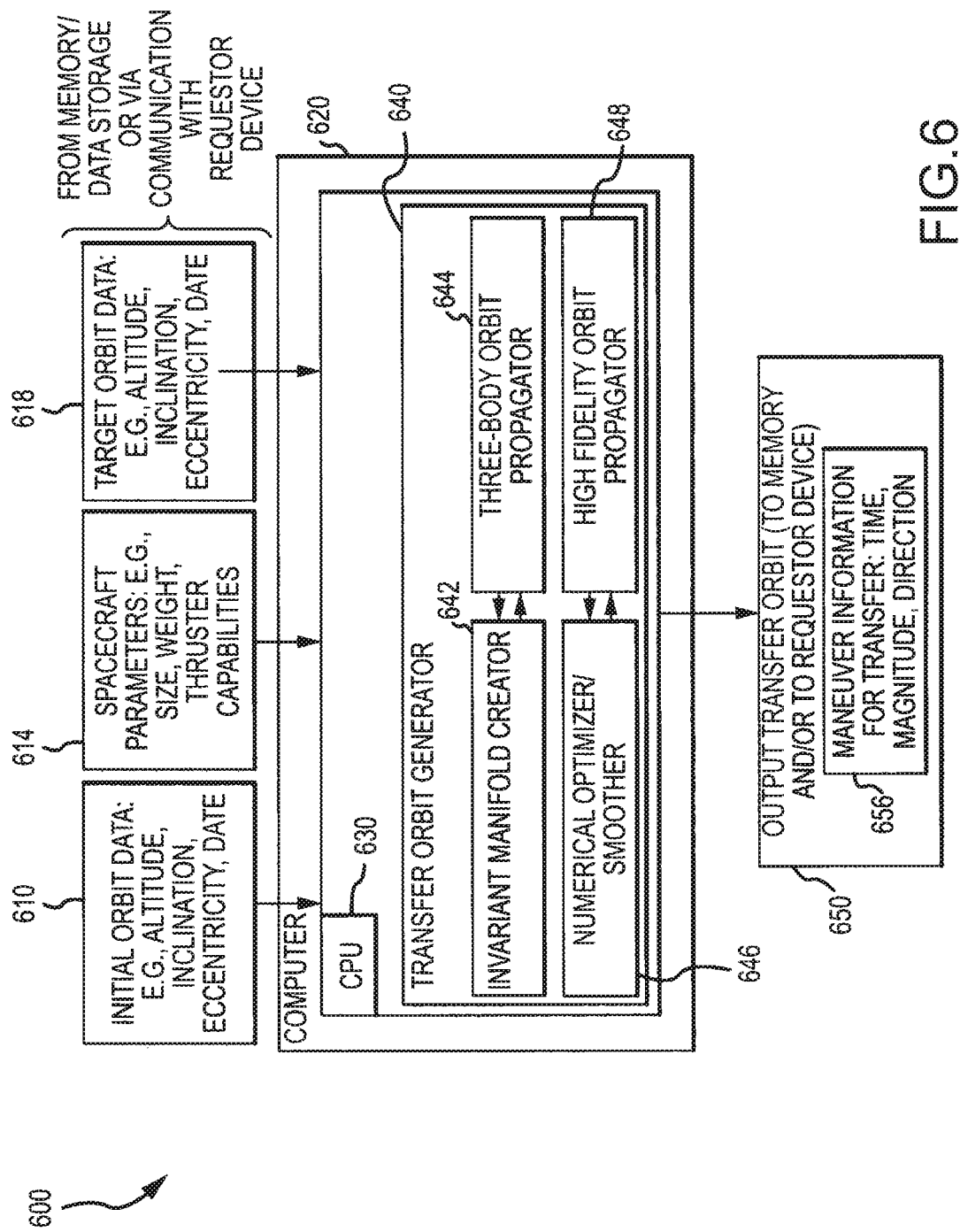
FIG. 6 is a partial functional block diagram of a computer system or network adapted for use in determining/generating a transfer orbit for moving a spacecraft such as a satellite from an initial orbit about a celestial body (e.g., the Earth or the like) into a target orbit about the celestial body (e.g., a larger radius orbit about the Earth or another celestial body)

FIG. 6 illustrates a system for use in generating transfer orbits according to the present invention such as by performing the method 200 of FIG. 2, As shown, the system 600 includes a computer 620 such as a server or a desktop, a laptop, a mobile, or other computer device or system with one or more processors 630. The processor 630 may be a central processing unit 630 adapted for accessing code in the form of a transfer orbit generator 640 in memory/data storage of the computer 620 (or in remote memory/data stores). To perform the functions of method 200, the generator 640 includes an invariant manifold creator 642 for performing steps 220, 230, and 240 of method 200. The manifold creator 642 communicates or interacts with a three-body orbit propagator 644 for assistance in performing these functions. The generator 640 also includes a numerical optimizer/smoother 646 for performing step 250 of method 200, and the optimizer/smoother 646 communicates or interacts with a high fidelity orbit propagator 648 to perform step 250.

The operation of the transfer orbit generator 640 results in generation or production of a final or output (or design) transfer orbit 650 that defines the transfer trajectory for a spacecraft (as defined by spacecraft parameters 614) from an initial or first orbit (as defined by initial orbit data 610) to a target or second/final orbit (as defined by target orbit data 618). To this end, the transfer orbit 650 may include control data for use in controlling operation of a propulsion system of a spacecraft (or its launch vehicle) such as maneuver information for transfer 656 that may include time, magnitude, and direction of each maneuver (e.g., the three maneuvers shown in FIGS. 3-5), with time defining a location on the orbits to perform a maneuver.

The transfer orbit 650 and maneuver information 656 may be stored in memory for later retrieval or may be communicated to (or otherwise provided to) a requestor such as over a network such as the Internet to a requesting device (e.g., another computer device capable of processing digital data). Likewise, the initial orbit data 610, the spacecraft parameters 614, and the target orbit data 618 may be retrieved from memory or data storage accessible (via a network or the like) by computer 620 or may be communicated in a wired or wireless manner over a digital communications network from a requesting device (e.g., a requestor's computer such as a mission designer or similar client's communication device that accesses the computer 620 to request the transfer orbit 650).

With regard to FIGS. 2-6 and method 200, steps 210 and 214 are done using computer 620 with high fidelity orbit propagation by propagator 648 to establish the initial and final orbits for the transfer. Using computer 620 with three-body orbit propagator 644, segments 330 and 340 are then found from manifolds that intersect the initial orbit 310 at location 332 and final orbit 320 at location 342. These manifolds are created using invariant manifold creator 642 originating from three-body orbit(s) as constructed within the three-body orbit propagator 644. Steps 220 and 230 are performed by utilizing assumptions of the Circular Restricted Three-Body Problem (CRTBP) (which is a model readily understood by those skilled in the art) and is thoroughly explained in the academic literature such that it does not require further explanation herein.

Particularly, in steps 220 and 230, invariant manifolds (e.g., ones that include segments 330, 340) are found from the Circular Restricted Three-Body Model. This may involve a process performed by manifold creator 642 that includes the propagation of many possible orbits and their subsequent manifolds in order to select manifolds that satisfy transfer requirements. In the case of the outward trajectory 330 this is a stable manifold and in the case of the return trajectory 340 this is an unstable manifold. The search for such trajectories that satisfy desired transfer requirements is non-trivial and may require extensive evaluation. An optimally efficient method for this process does not yet exist. Note, it is also possible to construct these transfers 330, 340 without this step if a-priori knowledge of the characteristics of the transfers is known or using a different type of targeting scheme.

In method 200, step 240 is performed (e.g., by generator 640 using a portion of the creator 642 or other modules/routines (not shown)) and often necessary (or at least desirable) because the outward and return trajectories 330, 340 will be discontinuous (see area 350 where a second maneuver, $\Delta V_2$, is to be performed). To make these segments/trajectories 330, 340 continuous both trajectories 330, 340 are discretized using an arbitrary number of patch points along the orbit as shown in FIG. 4 with discrete segment portions/lengths 431-447. Note, in some embodiments of method 200, this phase may be skipped or replaced using a variation of a shooting method or other process.

In method 200, step 250 is performed by the optimizer/smoother 646 with its output created by propagator 648. Step 250 may be performed using any of a wide variety of well-known methods/schemes of smoothing/optimization (i.e., the particular optimization or smoothing of segmented trajectories 330, 340 is not limiting to the invention). The associated discretized patch points (which may be selected by the mission designer) and the maneuvers of the transfer (nominally three, as shown in FIGS. 3-5 as $\Delta V_1$, $\Delta V_2$, and $\Delta V_3$) are altered to obtain a continuous trajectory from initial orbit to target orbit.

The inputs (items 610, 614, 618 shown in FIG. 6) into this process are the initial orbit, the final target orbit, and the spacecraft parameters. These may be retrieved from memory/data storage and/or received from a requestor (e.g. a mission designer). This input is used for modeling both the spacecraft behavior with respect to gravitational and other perturbations within a computational propagation set-up by propagator (e.g., one that may be specially designed for generator 640 or one that is common and commercially available).

The outputs of this process transfer orbit 650 of FIG. 6 including maneuver information 656) are the timing, the location, the magnitude, and the direction of each of the maneuvers that the spacecraft performs to complete the desired transfer. For example, the transfer trajectory data 650, illustrated in FIG. 6, output by the transfer orbit generator 640 defines the information to construct the 3 maneuver locations 332, 550, 342 (first, intermediate, and last maneuvers as shown in FIG. 5). Then, further, the transfer trajectory data 650 may define for the particular spacecraft defined by data 614 the magnitude and direction of the velocity changes ($\Delta V_1$, $\Delta V_2$, and $\Delta V_3$). As discussed, the components and steps described above are implemented using computer codes 640 and programs which are run on a processor 630 and take the aforementioned initial conditions 610, 614, and 618 to create the outputs required at each step including final output 650.

Overall, the procedure performed in system 600 takes as an input the orbit parameters of interest of the initial orbit and target orbit (data 610, 618). The procedure then uses these parameters to construct/design a transfer orbit (with creator 642), which successfully leverages the gravitational force of the larger second body (e.g., the Sun when the Earth is the first or smaller mass or body about which the spacecraft such as a satellite orbits) while simultaneously delivering the satellite from the initial orbit to the target orbit. Once this design has been completed, the trajectory is smoothed and/or optimized using a numerical scheme implemented via a code (module 646) run on a processor 630 of computer 620 to minimize the required change of velocity for the transfer or enhance other performance parameters of interest, while maintaining specific parameters of the initial and target orbits (defined in data 610, 618).

The final output 650 of this procedure is a complete transfer trajectory including the maneuver magnitudes and directions, the position and velocity requirements for the spacecraft, and systems level information about the spacecraft's location throughout the desired transfer. Maneuver information 656 may include (but is not limited to) the magnitudes and directions required to depart an initial orbit, to perform required trajectory correction maneuvers or mid-point maneuvers, and to arrive at the final orbit, which could then be used by launch vehicle and spacecraft teams to command/control their respective systems to implement the maneuvers required. The position, velocity, and location information can be used to track spacecraft performance, to confirm trajectory performance, and to model the requirements of the spacecraft subsystems (e.g. communications).

The procedure that is used to generate these orbit transfers may vary in its sequence, may not include every step, and/or may include additional steps depending on the precise orbit transfer being generated. For instance, given a good initial guess or estimate (which may be entered manually through a GUI or be selected from a set of previously generated transfer orbits by the tool 640 and stored in memory accessible by the CPU 630), one may skip the early portions of the sequence and move immediately to the optimizer/smoother steps performed by module 646.

With an understanding of a system for generating a transfer orbit/trajectory in hand, it may be useful to provide at least one specific example in which the produced transfer orbits would be very useful and in high demand by those skilled in the art (mission designers and the like). As discussed earlier, a very common problem in launching a spacecraft such as a communications satellite is how to move it from a LEO to a GEO. This problem is beneficially solved with the transfer trajectories taught herein as these trajectories are more efficient in many cases (less fuel required for a particular spacecraft) when compared with Hohmann or other conventional transfer techniques.

An initial step in creating a LEO to GEO transfer orbit may be to identify and construct the initial orbit. For example, many communications satellites are launched from Florida in the United states, and a LEO for such launches may be a 185 km circular parking orbit (eccentricity (or "e")=0) about the Earth at an inclination of 28.5 degrees, corresponding with a launch from Cape Canaveral, Fla. Another initial step is to identify and construct the target orbit, e.g., a geostationary Earth orbit or GEO defined with an altitude of 35786 km, e=0, and an inclination of 0 degrees).

After the initial and target orbits are defined and the spacecraft data is known, the method may include systematically building an unstable three-dimensional three-body orbit (an initial or early version of the transfer orbit) in the three-body system (e.g., Sun as the larger mass/size celestial body, the Earth as the smaller mass/size celestial body about which the spacecraft orbits, and the spacecraft as the third body with negligible mass/size compared with the other bodies in the model).

Then, using the assumptions of the Circularly Restricted Three-Body Problem that produces two primary components: (a) a stable manifold originating from a three-body orbit that intersects the position space of the initial orbit at the departure time and (b) an unstable manifold originating from the same (or different) three-body orbit that intersects the position space of the target orbit at the arrival time. The LEO to GEO transfer orbit method then continues with discretizing the particular trajectory in the stable manifold of the transfer orbit that intersects the initial orbit and with also discretizing the particular trajectory in the unstable manifold of the transfer orbit that intersects the target orbit. This may include constructing a list of an arbitrary number of patch-points, corresponding to states along the stable manifold and to states along the unstable manifold until their first close approach near the transfer orbit.

Next, the LEO to GEO orbit transfer method includes smoothing and/or optimizing the resulting discretized trajectory such that the orbit trajectory or designed/generated orbit transfer is continuous. The method can optionally include the addition of maneuvers to obtain this continuity (as this is readily possible). As a whole, the LEO to GEO orbit transfer can be optimized for the characteristic of interest (i.e., a mission designer may input or provide one or more transfer optimization parameters such as total maneuver required, time of flight, and/or other mission-defining parameters).

Conventional transfers to geostationary orbit (GEO) typically begin with the launch vehicle placing a spacecraft on a GEO transfer orbit: an orbit whose perigee is above the Earth's atmosphere and whose apogee is very near the GEO orbital radius. The spacecraft then traverses its GEO transfer orbit out to its apogee, which takes only a few hours. It may remain in this orbit for one or more revolutions, with optional maneuvers to adjust the orbit. The spacecraft then performs one or more perigee-raising maneuvers While traversing the transfer orbit's apogee. These maneuvers also typically reduce the orbit's inclination to nearly zero, relative to the Earth's equator.

Using this transfer as an example, the innovative orbit transfers described herein may cause a spacecraft to travel from a low Earth parking orbit or LEO to a distance ($D_{Transfer}$ in FIG. 5) near one million kilometers away from the Earth. At that distance, the spacecraft spends time traversing its apogee before returning back towards the Earth, during this time the Sun's gravitational influence alters the spacecraft's orbit relative to the Earth. The spacecraft's perigee radius rises to the GEO orbital radius, and the spacecraft's orbital inclination can be dropped to zero relative to the Earth's equator. When the spacecraft arrives at its GEO insertion point, most of the inclination change has been accomplished by Solar gravity and the arrival velocity is such that much less fuel is required to perform the "final" maneuver or final orbit maneuver. This attribute of the transfer is a key performance advantage as it delivers additional performance to the spacecraft itself. The spacecraft then performs the final maneuver to insert the spacecraft into an approximately circular, equatorial near-geostationary orbit (e.g., a GEO). Of course, though, additional maneuvers can be used to more precisely position the spacecraft into its geostationary slot about the Earth or to retain such an orbit.

Figure 7:
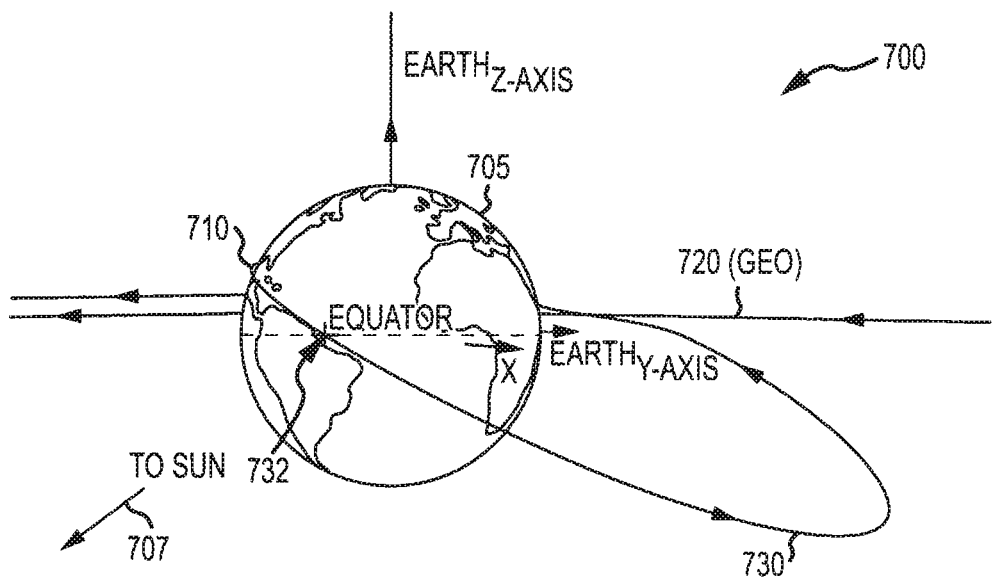
FIGS. 7-9 illustrate a celestial body (such as the Earth) with an initial orbit (e.g., a LEO), a transfer orbit, and a target orbit (e.g., a GEO) that may be used to command or control a mission of a spacecraft according to the teaching herein (e.g., to deliver a communications satellite using less fuel).

FIG. 7 illustrates, with a schematic flight path drawing 700, the first part of an example LEO to GEO transfer using this new transfer concept and associated techniques. Particularly, The drawing 700 shows the Earth 705 rotating about its Z-axis and further shows the Earth's Y-axis passing contained in the plane that includes the Equator (e.g., an orbit such as a GEO in this plane has an inclination of 0 degrees and elsewhere has an inclination measured between the Equatorial plane and the plane containing the other orbit). The drawing 700 also shows with arrow 707 the location of the Sun relative to the Earth (the large mass body in the three-body model that also includes the Earth 705 in this example).

One can see in drawing 700 the initial Earth parking orbit 710, which has been modeled as a circular orbit that has an altitude of 185 km and an inclination of 28.5 degrees (e.g., a 28.5 degree LEO orbit). The transfer orbit is made up of a first or initial trajectory or segment 730 with a first maneuver or initial orbit exit maneuver (e.g., defined by location, magnitude, and direction of change in velocity of a spacecraft (not shown but assumed to be traveling or to later travel on the shown orbits)) at location 732 (where the trajectory 730 intersects the initial orbit 710). Also, shown in drawing 700 is the target orbit 720 about the same celestial body 705 (e.g., a GEO about the Earth).

Figure 8:
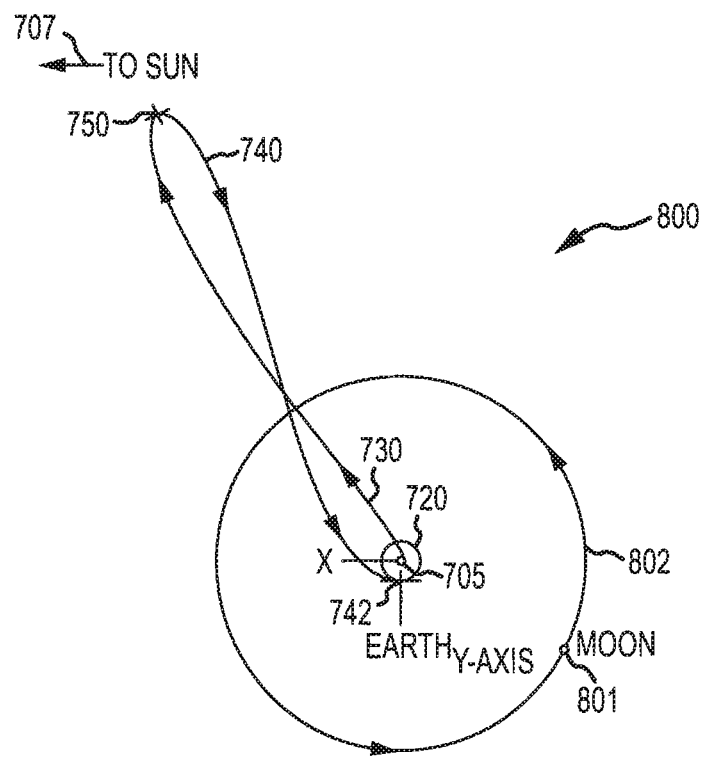

FIG. 8 illustrates the same modeled transfer of a spacecraft showing the Sun-Earth rotating coordinate frame 800 and the entire design transfer orbit (e.g., the transfer from above the ecliptic in the Sun-Earth rotating coordinate frame), including the orbit 802 of the Moon 801 about the Earth 705. As shown, a satellite may perform the first maneuver to exit the first orbit (e.g., 28.5 degree LEO) to enter the first portion or trajectory/segment 730 of the transfer orbit. The satellite follows this trajectory 730 a large radial distance, e.g., 10 or more times the radius of the target orbit 720 (e.g., a GEO in this case). This flight path causes the spacecraft to travel toward the Sun, with the Sun's relative location shown with arrow 707. The transfer orbit defines a location 750 for a second maneuver or a return-toward-first celestial body maneuver (a relatively small maneuver with regard to change in velocity when compared with the first maneuver), which is of a direction and magnitude to cause the satellite or other spacecraft to move from the first trajectory/segment 730 onto the second or return trajectory/segment 740.

Figure 9:
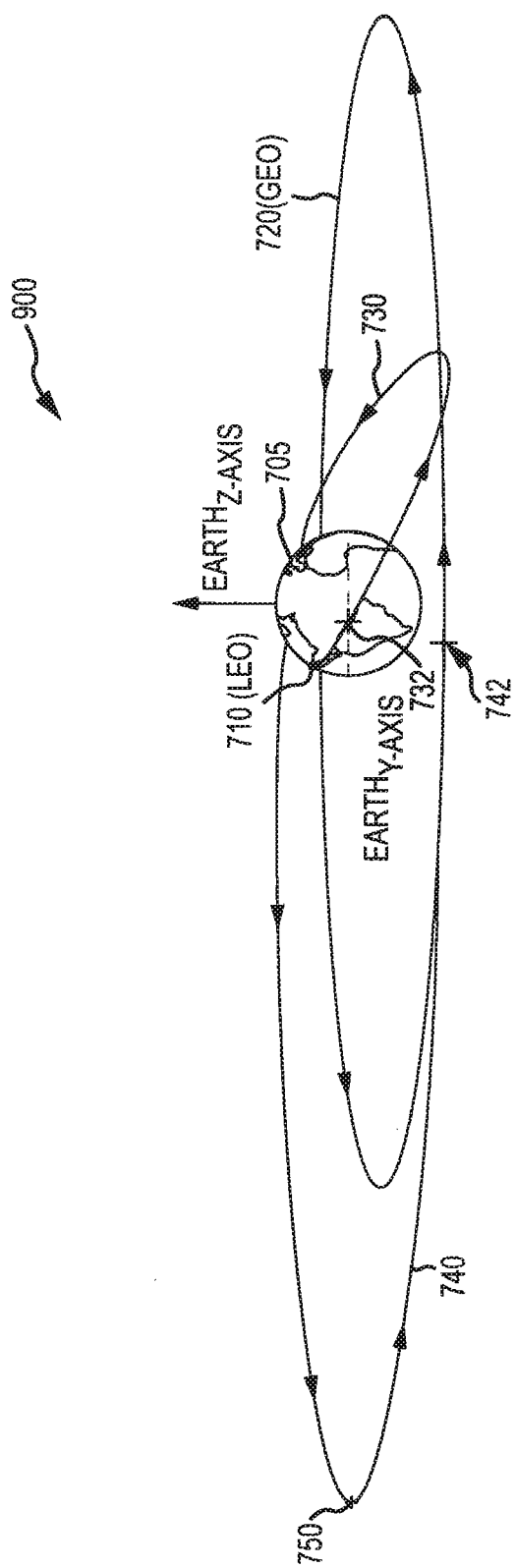

FIG. 9 shows a schematic drawing or model 900 that is similar to that of FIG. 7 but from a more distant vantage point relative to the Earth 705. The drawing 900 shows clearly the portion of the transfer where the spacecraft arrives at the target orbit 720 at location 742 where a third maneuver or target orbit insertion maneuver is performed (based on maneuver data provided in the transfer orbit) to insert the satellite/spacecraft into the geostationary orbit or other target orbit 720 about the first celestial body (medium sized body in the three-body model). Note, FIG. 9 does not show the radial distance of location 750 for the intermediate maneuver accurately so as to allow the orbit 740 to fit on one page with the final orbit 720, with FIG. 8 being more accurate in showing that transfer orbit 740 may have a radius that is 10 or more times the radius of the final orbit 720.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method for generating efficient transfer orbits, comprising:
    for a spacecraft, identifying an initial orbit about a first celestial body, wherein the first celestial body is the Earth and the initial orbit has a perigee altitude of less than 2000 kilometers;
    identifying a target orbit for the spacecraft about the first celestial body; and
    using a processor running a transfer orbit generator to generate a transfer orbit for the spacecraft from the initial orbit to the target orbit using gravitational effects of a second celestial body larger in mass than the first celestial body, the transfer orbit generating by the transfer orbit generator including:
        building a stable three-body, three-dimensional manifold that intersects the initial orbit; and
        building an unstable three-body, three-dimensional manifold that intersects the target orbit, wherein the stable and unstable three-body, three-dimensional manifolds each defines a three-dimensional shape that encapsulates a set of possible transfer orbits or trajectories originating from or terminating on an unstable three-body orbit;
    wherein the method further comprises moving the spacecraft along the transfer orbit.

2. The method of claim 1, wherein the transfer orbit generating further comprises selecting a segment from the stable three-body manifold, selecting a segment from the unstable three-body manifold, and discretizing both the segments into a plurality of smaller segments.

3. The method of claim 2, wherein the stable segment has a first end intersecting the initial orbit corresponding to a location of a first maneuver for the spacecraft to initially move the spacecraft into the transfer orbit and a second end, corresponding to a second maneuver for the spacecraft, interposed between the first and second celestial bodies and wherein the unstable segment has a first end intersecting the target orbit corresponding to a third maneuver for the spacecraft and a second end, corresponding to the second maneuver, interposed between the first and second celestial bodies.

4. The method of claim 3, wherein the transfer orbit generating further comprises performing at least one of smoothing and optimizing on the discretized segments to form a continuous trajectory for the spacecraft, whereby the transfer orbit is defined by the continuous trajectory including locations of the first, second, and third maneuvers.

5. The method of claim 4, wherein the transfer orbit further defines directions and magnitudes of the first, second, and third maneuvers to transfer the spacecraft from the initial orbit to the target orbit.

6. The method of claim 1, wherein ends of the stable and unstable manifolds that are distal to the first celestial body are at a radial distance that is at least ten times the radius of the target orbit.

7. The method of claim 1, further including controlling operations of a spacecraft based on the transfer orbit to transfer the spacecraft from the initial orbit to the target orbit about the first celestial body.

8. The method of claim 1, wherein the second celestial body is the Sun and the target orbit is a GEO.

9. The method of claim 1, wherein the stable and unstable manifolds are built based on the Circular Restricted Three-Body Model (CRTBM).

* * * * *